United States Patent [19]

Buttifant

[11] Patent Number: 4,749,087

[45] Date of Patent: Jun. 7, 1988

[54] AUTHENTICITY SENSING

[75] Inventor: John Buttifant, Fratton, England

[73] Assignee: De la Rue Systems Limited, Great Britain

[21] Appl. No.: 872,186

[22] Filed: Jun. 9, 1986

[30] Foreign Application Priority Data

Jun. 7, 1985 [GB] United Kingdom ................. 8514391

[51] Int. Cl.[4] ......................... B07C 5/344; G06K 5/00

[52] U.S. Cl. .................................... 209/534; 209/567; 324/232; 382/7

[58] Field of Search ................ 209/534, 567; 194/206; 235/449, 450; 324/226, 232, 260-262; 382/7, 64

[56] References Cited

U.S. PATENT DOCUMENTS

| | | | |
|---|---|---|---|
| 3,509,535 | 4/1970 | Berube | 194/206 X |
| 3,870,629 | 3/1975 | Carter et al. | 209/534 |
| 3,966,047 | 6/1976 | Steiner | 209/534 |
| 3,980,990 | 9/1976 | Berube . | |
| 4,349,111 | 9/1982 | Shah et al. | 209/534 |
| 4,464,787 | 8/1984 | Fish et al. | 382/7 |
| 4,490,846 | 12/1984 | Ishida et al. | 382/7 |
| 4,500,002 | 2/1985 | Koshio et al. | 209/534 |
| 4,584,529 | 4/1986 | Aoyama | 209/534 X |
| 4,628,194 | 12/1986 | Dobbins et al. | 209/534 X |

FOREIGN PATENT DOCUMENTS

| | | | |
|---|---|---|---|
| 0056116 | 7/1982 | European Pat. Off. . | |
| 52-50789 | 4/1977 | Japan | 194/206 |
| 0971625 | 9/1964 | United Kingdom . | |
| 1476681 | 6/1977 | United Kingdom . | |
| 2114795 | 8/1983 | United Kingdom . | |

*Primary Examiner*—Johnny D. Cherry
*Assistant Examiner*—Edward M. Wacyra
*Attorney, Agent, or Firm*—Ostrolenk, Faber, Gerb & Soffen

[57] ABSTRACT

A method for determining whether a test sheet, such as a banknote, is a genuine reproduction of a reference sheet having a magnetic characteristic such as being printed with a ferromagnetic ink. The method comprises sensing for a magnetic effect, such as a magnetic field, with a suitable detector (14) from a plurality of areas (A-D) of the test sheet. The sensed magnetic effects are compared from two different groups (B, D) of one or more of the areas; and the test sheet is classified as unacceptable if the relationship between the magnetic effects of the compared groups is not within limits previously determined as acceptable for the relationship between the magnetic effects of the same pair of groups of areas of the reference sheet.

15 Claims, 3 Drawing Sheets

AUTHENTICITY SENSING

FIELD OF THE INVENTION

The invention relates to methods and apparatus for determining whether a test sheet is a genuine reproduction of a reference sheet.

DESCRIPTION OF THE PRIOR ART

Certain documents, for example some security documents and banknotes, are printed at least partially with a ferromagnetic ink. The use of such inks increases the security of the document concerned against counterfeiting. When such sheets are tested for authenticity it has previously been the practice simply to scan the sheet to determine a total value related to the quantity of ferromagnetic ink in a portion of the sheet and then to compare this with a previously determined reference value. If the determined value does not fall within upper and lower thresholds centred on the reference value, it is assumed that the sheet is not authentic. An example of this type of method is illustrated in U.S. Pat. No. 3,509,535.

One of the problems with the known methods is that poor quality genuine sheets (ie. authentic reproductions of a reference sheet), which for example have been subjected to long use exhibit a significantly lower quantity of ferromagnetic ink than a new sheet. The previously known method could only deal with this by setting relatively wide thresholds about the reference value. This, however, leads to a higher probability that counterfeit sheets could be authenticated.

SUMMARY OF THE INVENTION

In accordance with one aspect of the present invention, a method of determining whether a test sheet is a genuine reproduction of a reference sheet having a magnetic characteristic comprises sensing for a magnetic effect from a plurality of areas of the test sheet; comparing the magnetic effects sensed from two different groups of one or more of the areas; and classifying the test sheet as unacceptable if the relationship between the magnetic effects of the compared groups is not within limits previously determined as acceptable for the relationship between the magnetic effects of the same pair of groups of areas of the reference sheet.

The invention differs from the prior methods in that instead of setting an absolute threshold against which each test sheet is compared, the relationship between two different groups of one or more of the areas is determined for the test sheet and a reference sheet and then this relationship is compared. If it is assumed that the degree of change in quality of a sheet will be substantially uniform over the entire sheet then the invention leads to a significant improvement over the prior method by eliminating the affect of decrease in ink quantity.

The magnetic effect typically comprises a magnetic field whose strength is sensed.

Typically, the method includes a preliminary step of activating a magnetic material in or on the sheet to be tested. In general, the magnetic effect will not exist permanently in the sheet as for example is the case where the magnetic characteristic is constituted by a ferromagnetic ink with which the sheet is at least partly printed. It is therefore necessary to activate the magnetic effect which, in the case of ferromagnetic inks, may comprise exposing the sheet of a magnetic field.

Conveniently, the sensing step comprises generating a value indicating the presence of a magnetic effect only if the magnetic effect exceeds a threshold. This enables the magnetic effect to be digitally encoded.

Preferably, the magnetic effect due to an area is determined by sensing for the magnetic effect in a plurality of subsidiary areas. Where the magnetic effect is digitally coded, the total magnetic effect for an area can then be determined by summing the number of subsidiary areas where a magnetic effect exceeding the threshold was sensed.

In one example, one of the groups may comprise a single area while the other comprises at least two areas including the one area forming the one group. For example, in certain banknotes such as U.S. one dollar bill there is a seal area printed with ferromagnetic ink. In addition, there are other areas printed with ferromagnetic ink and in this particular example a centrally positioned, elongate portion extending along the length of the dollar bill is examined and then a comparison made between the strength of the magnetic effect in the seal area and the strength of the magnetic effect of the scanned portion. Thus, if a low level magnetic effect is detected in the seal area, it would be expected that a correspondingly low level would be detected for the entire portion.

In another example, each group may comprise a single, different area. For example, in the U.S. dollar bill application mentioned above, there are, in fact, two seal areas one of which is printed with ferromagnetic ink at high density and the other which is not printed with ferromagnetic ink. It is therefore to be expected that a difference will be detectable between the two seal areas. If, however, they both result in a high or low magnetic effect then it is likely that the sheet under test is not genuine.

One particularly convenient method comprises sensing magnetic effects from two pairs of different groups of one or more of the areas, determining the relationship between the magnetic effects of the groups of each pair; and classifying the test sheet as unacceptable if one or both the determined relationships is not within limits previously determined as acceptable for each of the relationships between the magnetic effects of the same pairs of groups of areas of the reference sheet. Clearly, this can be extended to as many pairs of groups as required.

It should be understood that the areas referred to may not be physically spaced apart on the sheet but can be continuous, the boundaries between areas being determined prior to carrying the method out. In fact, these areas will normally be different for each type of sheet to be tested.

In accordance with a second aspect of the present invention, apparatus for determining whether a test sheet is a genuine reproduction of a reference sheet having a magnetic characteristic comprises a magnetic effect detector; comparison means for comparing the magnetic effects sensed by the sensor from two different groups of one or more areas of the test sheet and for determining a relationship therebetween; a store for storing data representing acceptable relationships between the magnetic effects of the two corresponding groups of one or more areas of the reference sheet; and authenticating means for classifying the test sheet as unacceptable if the relationship between the magnetic effects of the compared groups is not within limits previously determined as acceptable for the relationship between the magnetic effects of the same pair of groups of areas of the reference sheet.

Conveniently, the comparison means and the authenticating means are provided by a suitably programmed microcomputer.

The apparatus may form part of sheet sorting apparatus such as banknote sorting apparatus which responds to the result of the classifying step by diverting the test sheet in one of two directions according to whether the sheet is classified as acceptable or unacceptable. An example of a suitable sorting apparatus is the De La Rue Systems 3400 banknote sorter.

BRIEF DESCRIPTION OF THE DRAWINGS

In order that the invention may be better understood, an embodiment of a preferred method and apparatus will now be described with reference to the accompanying drawings, in which.

DETAILED DESCRIPTION OF AN EMBODIMENT

Figure 1:
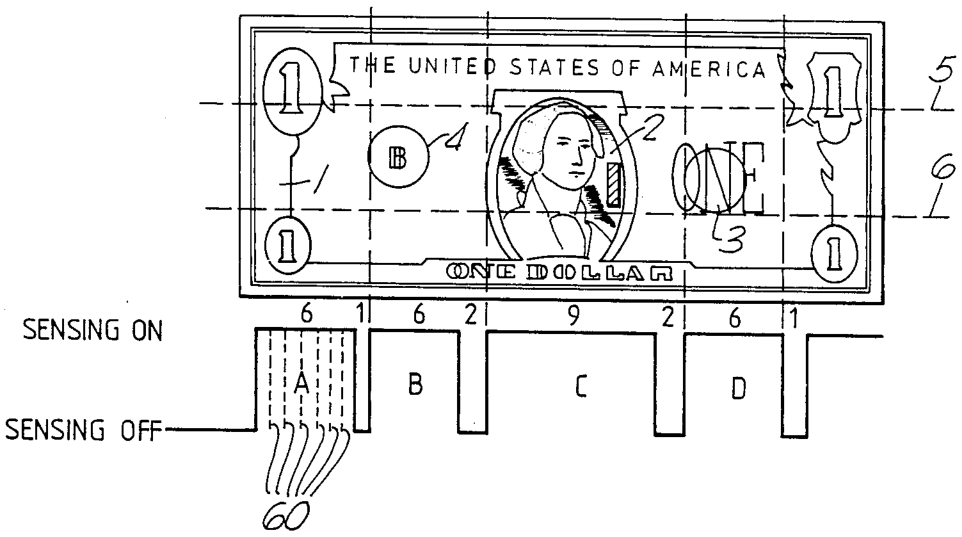
FIG. 1 illustrates schematically a U.S. one dollar bill.

FIG. 1 illustrates the typical form of a U.S. one dollar bill. Various parts of this banknote are printed with a ferromagnetic ink. These parts include border areas 1 of the note, an area 2 including a representation of the President's head, and a word "ONE" in an area 3. A seal area 4 is printed with predominantly non-ferro magnetic ink. The purpose of the invention is to scan an area of the banknote defined between boundary lines 5, 6. This portion of the note includes both the areas 3, 4 and a large proportion of the President's head area 2. One of the properties of genuine banknotes is that the ratio between the density of ferromagnetic ink in the areas 3, 4 is substantially constant. In addition, the ratio between the quantity of ferromagnetic ink in the area 3 and the total quantity sensed between the boundary lines 5, 6 should be substantially constant. That is to say, if the quantity of ferromagnetic ink in the area 3 is low, it would be expected that the total quantity between the boundary lines 5, 6 will also be low. This would be due to the effect of use.

Figure 2:
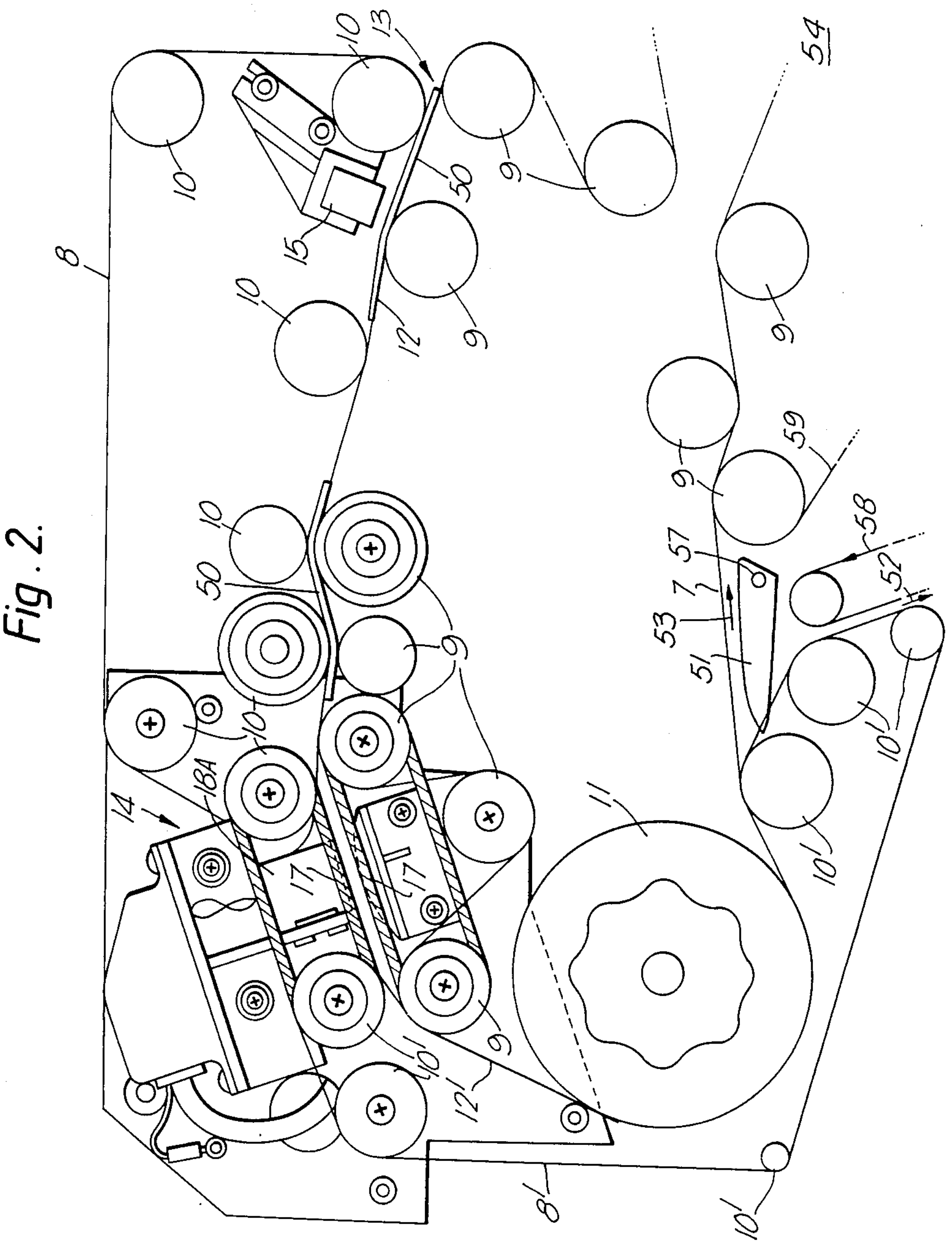
FIG. 2 is a side elevation of part of banknote sorting apparatus.

FIG. 2 illustrates an example of apparatus for feeding a banknote past a magnetic field detector. The apparatus includes a pair of transport belts 7, 8 entrained about rollers 9,10 and a drive roller 11. The drive roller 11 is driven by a motor (not shown). The transport belts 7,8 define a first flow path 12 for carrying single banknotes 50 from an input station 13 to a magnetic detector 14. Sheets are fed without stopping through the detector 14 into a second flow path 12' defined by the belt 7 and a belt 8' entrained around rollers 10' and shown in FIG. 2. The second flow path 12' leads to a diverter 51 which diverts the sheets in one of two directions 52, 53 towards a store or output position (not shown) in conjunction with belts 8', 58 or a dump 54 along a path defined by belts 7, 59 depending upon the reults of the authenticity tests to be described below.

A permanent magnet 15 is mounted adjacent the first flow path 12 at a distance of between 1 and 2 mm from the flow path. As a banknote 50 passes the permanent magnet 15, the ferromagnetic ink on the banknote is magnetised by the magnet. The magnetised banknote is then carried between the moving belts 7, 8 along the flow path 12 to the detector 14 and between a pair of spaced, guide "O" rings 17. Initially the leading end of the note is pushed between the "O" rings by movement of the belts 7, 8 until it passes into the flow path 12' whereupon the remainder of the note 13 is carried past the detector 14 into the flow path 12' due to movement of the belts 7, 8'.

The magnetic detector 14 includes a magnetic head 18A including a coil 18B (FIG. 3) connected in a tuned circuit 19. The boil 18B is arranged to be about 2 mm from the note path through the detector 14.

Figure 3:
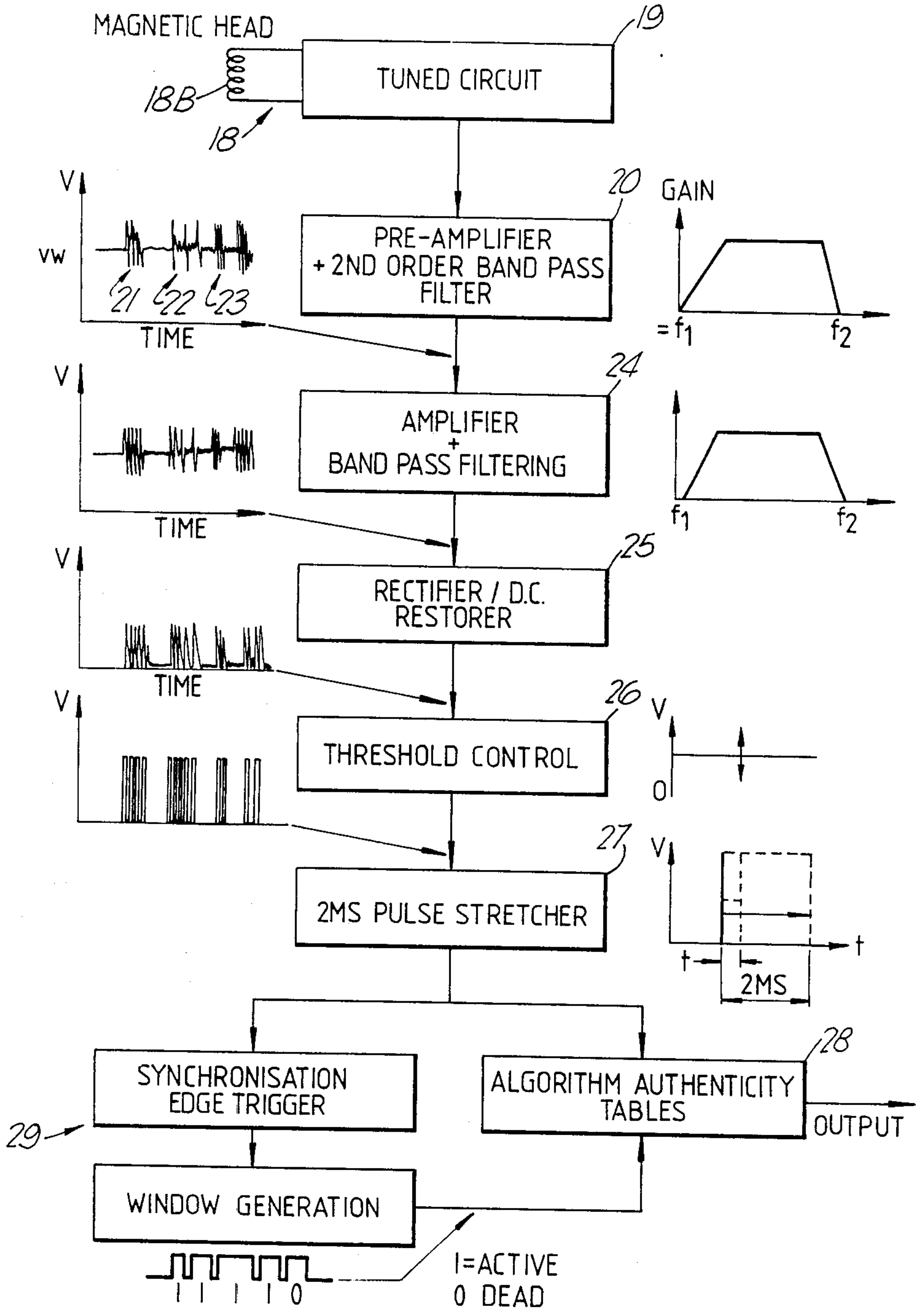
FIG. 3 is a block diagram of the processing circuitry for authenticating test banknotes, with the signals at each point in the circuit being illustrated graphically; and, FIG. 4 is a block diagram of the apparatus for controlling the diverter of FIG. 2.

The output signal from the tuned circuit 19 is fed to a preamplifier and second order band pass filter 20 which provides an output signal having a voltage which varies in accordance with the strength of the detected magnetic field. This output signal is shown in FIG. 3 and it will be seen comprises an initial highly varying portion 21 corresponding to the passage of a leading part of the border 1 of the note followed by portions 22, 23 corresponding to the President's head area 2 and the area 3. Since this is a genuine banknote, no response is obtained from the seal area 4.

The analogue output signal from the preamplifier 20 is fed to a second amplifier and bandpass filter 24 which smooths the signal and removes noise, and the output signal from this amplifier 24 is fed to a rectifier 25. The rectified signal is compared with a predetermined threshold (constituting a minimum level below which it is assumed no magnetic field is sensed) by circuit 26 to produce a digital signal which is modified by a 2 millisecond pulse stretching circuit 27. The threshold may be, for example, 250 mV above background noise of a non-magnetic banknote. This finally digitised signal is fed in parallel to a processing microcomputer 28 and a window generation circuit 29.

The purpose of the window generation circuit 29 is to synchronise the incoming signal with the spatial positions on the banknote. This is achieved by setting the leading edge of the first window at the point when a magnetic effect is first detected.

Figure 4:
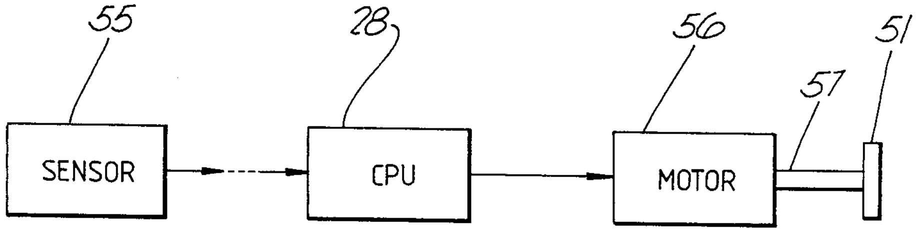

The elements 19, 20, 24–27 may be provided on a single processing board 55 (FIG. 4) and the elements 28, 29 on another board.

The windows are preset to correspond to defined areas of the banknote within which the strength of the magnetic field is to be determined. In the example shown in FIG. 1, these windows are labelled A–D and cover the leading portion of the border 1, the seal area 4, the President's head area 2, and the area 3 respectively. These windows correspond to 6, 6, 9, and 6 sampling periods of the magnetic head 18A respectively. The six sampling periods 60 defining window A are shown in FIG. 1. The size of the portion of the note sensed by the head 18A in a sampling period depends upon the speed of movement of the banknote past the head and the response time of the head.

Each window A–D is separated by one or two sampling periods as indicated in FIG. 1.

The presence of a magnetic field having a strength exceeding the threshold is determined for each sampling period. The microcomputer 28 then carries out the following authentication steps.

Firstly, the total number of sampling periods in which a magnetic field is sensed is determined by the microcomputer. This total number is then compared by the microcomputer with the total number of sampling periods constituting the four windows (in this example 27) and if the number of periods in which a magnetic field has sensed is less than a predetermined proportion (eg. 30%) of the total number of sampling periods, the banknote is classed as counterfeit. In that event, the microcomputer 28 will generate a suitable control signal to actuate a rotenoid (or rotary solenoid) 56 to cause rotation of a drive shaft 57 attached to the diverter 51 in the direction appropriate to cause the note to be fed to the dump 54. The control signal generated by the microcomputer 28 will either be a binary "1" indicating "counterfeit" or a binary "0" indicating "authentic".

If the note passes this first test, the microcomputer then compares the total magnetic field determined in the window D (including the area 3) with the total magnetic field determined in the window B (including the seal area 4). These totals are equal to the number of sampling periods in respective windows in which a magnetic field exceeding the threshold is sensed (see above). As is explained above, it is to be expected that the window D will have a much higher total magnetic field than the window B. An example of a decision table used by the microcomputer is shown in Table 1 below. In this table a "0" signifies an acceptable relationship whereas a "1" indicates an unacceptable relationship.

TABLE 1

| Window B 100% ←→ 0% No of sampling periods in which magnetic field is sensed: 6 | 5 | 4 | 3 | 2 | 1 | 0 | | | |
|---|---|---|---|---|---|---|---|---|---|
| 0 | 0 | 0 | 0 | 0 | 0 | 0 | 0 | 0% | |
| 0 | 0 | 0 | 0 | 1 | 0 | 0 | 1 | ↑ | |
| 0 | 0 | 0 | 1 | 1 | 1 | 0 | 2 | ↑ | |
| 1 | 1 | 1 | 1 | 1 | 0 | 0 | 3 | ↑ | Window D |
| 1 | 1 | 1 | 1 | 0 | 0 | 0 | 4 | ↓ | |
| 1 | 1 | 1 | 1 | 0 | 0 | 0 | 5 | ↓ | |
| 1 | 1 | 1 | 1 | 0 | 0 | 0 | 6 | 100% | |

This table has a symmetrical form since it is not known in advance in which way the note will be fed.

It will be seen that if both windows B, D exhibit a significant magnetic effect then the note will be rejected since this will mean that the seal area 4 is not non-ferromagnetic.

Once again, if this test fails then the sheet is immediately rejected as counterfeit and diverted to the dump 54.

Finally, a third comparison is made between the total magnetic field strength determined for the four windows A–D and the window D. This is for the purpose of rejecting banknotes in which a general level of magnetism over the scanned portion is not reflected by the area 3. An example of a decision table for use by the microprocessor 28 in this test is illustrated in Table 2 below.

TABLE 2

| Window D 100% ←→ 0% No of sampling periods in which magnetic field is sensed: 6 | 5 | 4 | 3 | 2 | 1 | 0 | | | |
|---|---|---|---|---|---|---|---|---|---|
| 1 | 1 | 1 | 1 | 1 | 0 | 0 | 0 | 0% | |
| 1 | 1 | 1 | 1 | 0 | 0 | 0 | 1 | ↑ | |
| 1 | 1 | 1 | 0 | 0 | 0 | 0 | 2 | ↑ | |
| 1 | 1 | 1 | 0 | 0 | 0 | 0 | 3 | ↑ | Total Magnetism (A + B + C + D) |
| 1 | 0 | 0 | 0 | 0 | 0 | 1 | 4 | ↑ | |
| 0 | 0 | 0 | 0 | 0 | 0 | 1 | 5 | ↑ | |
| 0 | 0 | 0 | 0 | 0 | 1 | 1 | 6 | ↓ | |
| 0 | 0 | 0 | 0 | 0 | 1 | 1 | 7 | ↓ | |
| 0 | 0 | 0 | 0 | 0 | 1 | 1 | 8 | ↓ | |
| 0 | 0 | 0 | 0 | 0 | 1 | 1 | 9 | ↓ | |
| 0 | 0 | 0 | 0 | 1 | 1 | 1 | 10 | 100% | |

In this table it is assumed that a maximum of ten sampling periods will exhibit a magnetic field exceeding the threshold.

Thus if window D exhibits a high or low magnetic effect, this is acceptable if the overall magnetic effect is also high or low respectively.

If this test proves the note to be counterfeit it will be diverted to the dump 54. Otherwise, the diverter 51 will be set to allow the note to pass to a store or to a further test system.

The decision tables illustrated will typically be constituted by look-up tables (LUTs) whose content will be determined empirically by passing known or reference authentic sheets.

Other banknotes may have magnetic areas along more than one elongate line. In this case the detector 14 may have two heads 18A spaced transversely of the note path and in alignment with the elongate lines of the note. The same tests will be carried out on each line and the note only authenticated if both sets of tests are satisfactory. If changes in the performance are required, this can then be arranged simply by changing the matrix coordinates.

I claim:

1. A method of determining whether a test sheet is a genuine reproduction of a reference sheet having a magnetic characteristic, said method comprising the steps of:

sensing magnetic effects from two pairs of different groups, each group comprising at least one area of said test sheet which is capable of being scanned for magnetic effects;

determining the relationship between the magnetic effects of said groups in each pair;

for each pair, comparing said determined relationship to acceptability limits for the relationship predetermined by reference to the relationship of corresponding groups in said reference sheet, and determining for each pair whether the relationship of magnetic effects of said groups in said test sheet is within said predetermined limits; and classifying said test sheet as unacceptable if for either pair said determined relationships are not within said predetermined acceptability limits.

2. The method according to claim 1, further including a preliminary step of activating a magnetic material in said sheet to be tested.

3. The method according to claim 2 wherein at least a portion of said magnetic material is on the surface of said sheet to be tested.

4. The method according to claim 1, wherein said sensing step comprises generating a value indicating the presence of a magnetic field only if said magnetic effect exceeds a threshold.

5. The method according to claim 1, wherein the magnetic effect due to said at least one area is determined by sensing for said magnetic effect in a plurality of subsidiary areas.

6. The method according to claim 5, wherein said sensing step comprises generating a value indicating the presence of a magnetic field only if said magnetic effect exceeds a threshold; and wherein the total magnetic effect for said at least one area is determined by summing the number of said subsidiary areas where a magnetic effect exceeding said threshold is sensed.

7. The method according to claim 1, wherein one of said groups comprises a single area while the other comprises at least two areas including said one area forming said one group.

8. The method according to claim 1, wherein each said group comprises a single, different area.

9. The method according to claim 1, wherein the ratio of the magnetic effects of said pair of groups is compared with a predetermined threshold.

10. A method of determining whether a test sheet is a genuine reproduction of a reference sheet having a magnetic characteristic, the method comprising (a) sensing for a magnetic effect from a plurality of areas of said test sheet; determining the ratio between the number of said area in which a magnetic effect is sensed and the total number of said plurality of areas; and classifying said sheet as unacceptable if said determined ratio is not within limits previously determined as acceptable for the corresponding ratio for the reference sheet;

(b) if said test sheet is not rejected in step a, comparing the magnetic effects sensed from two different groups each comprising at least one of said areas; and classifying said sheet as unacceptable if the relationship between the magnetic effects of said compared groups is not within limits previously determined as acceptable for the relationship between the magnetic effects of the same pair of groups of areas of said reference sheet;

(c) if said test sheet is not rejected in step (b), repeating step b, at least once but not more than a predetermined maximum number of times, with another pair of groups of said areas;

and classifying said sheet as acceptable only if it has not been classified as unacceptable in any of said steps a–c.

11. A method of sorting banknotes, the method comprising feeding the banknotes in series along a feed path activating a magnetic material in said banknote; and for each banknote sensing for a magnetic effect from a plurality of areas of said banknote; comparing said magnetic effects sensed from two pairs of two different groups, each group comprising at least one of said areas; and classifying said banknote as unacceptable if the relationship between the magnetic effects of said compared groups in either pair is not within limits previously determined as acceptable for the relationship between the magnetic effects of the corresponding groups of areas of a reference banknote; and causing said banknote to be fed towards a dump if said not has been classified as unacceptable.

12. The method according to claim 11 wherein at least a portion of said magnetic material is on the surface of said banknote.

13. Apparatus for determining whether a test sheet is a genuine reproduction of a reference sheet having a magnetic characteristic, the apparatus comprising:

a magnetic effect detector; comparison means for comparing the magnetic effects sensed by the detector from two pairs of two different groups, each group comprising at least one area of said test sheet capable of being scanned for magnetic effects, and for determining a relationship between magnetic effects of said groups;

a store for storing data representing acceptable relationships between the magnetic effects of corresponding groups of said reference sheet; and authenticating means for classifying said test sheet as unacceptable if the relationship between the magnetic effects of the compared groups in either pair is not within limits previously determined as acceptable for the relationship between said magnetic effects of the corresponding group of said reference sheet.

14. The apparatus according to claim 13, wherein said comparison means and said authenticating means are provided by a suitably programmed microcomputer.

15. A banknote sorting apparatus comprising the apparatus according to claim 13; and further comprising a diverting means responsive to a control signal generated by said authenticating means to divert said banknote in one of two directions according to whether or not said banknote is classified as unacceptable.

* * * * *